(12) United States Patent
Taipale et al.

(10) Patent No.: US 7,702,307 B2
(45) Date of Patent: Apr. 20, 2010

(54) FREQUENCY MODULATION RADIO RECEIVER INCLUDING A NOISE ESTIMATION UNIT

(75) Inventors: Dana J. Taipale, Austin, TX (US); G. Tyson Tuttle, Austin, TX (US); Gerald D. Champagne, Buda, TX (US); Javier Elenes, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 1045 days.

(21) Appl. No.: 11/374,533

(22) Filed: Mar. 13, 2006

(65) Prior Publication Data

US 2007/0213021 A1     Sep. 13, 2007

(51) Int. Cl.
*H04B 17/00* (2006.01)
(52) U.S. Cl. .............. 455/226.3; 455/226.1; 455/226.2; 455/296
(58) Field of Classification Search ............. 455/226.3, 455/226.2, 226.1, 296, 42, 501, 63.1, 67.13, 455/114.2, 115.3, 134–135, 161.3, 205, 222, 455/277.2, 278.1; 381/11, 13, 94.1, 94.3
See application file for complete search history.

(56) References Cited

U.S. PATENT DOCUMENTS

| | | | |
|---|---|---|---|
| 6,553,007 B1* | 4/2003 | Pekkarinen | 370/310 |
| 6,614,860 B1* | 9/2003 | Piirainen | 375/341 |
| 2003/0039363 A1 | 2/2003 | Wildhagen | |
| 2003/0058951 A1* | 3/2003 | Thomson et al. | 375/260 |
| 2007/0254592 A1* | 11/2007 | McCallister et al. | 455/67.11 |
| 2008/0064357 A1* | 3/2008 | Gozen | 455/296 |

\* cited by examiner

*Primary Examiner*—Pablo N Tran
(74) *Attorney, Agent, or Firm*—Meyertons, Hood, Kivlin, Kowert & Goetzel, P.C.

(57) ABSTRACT

A frequency modulation (FM) radio receiver includes a processing unit that may generate a magnitude value corresponding to a signal strength of each of a plurality of digital samples of a received FM signal. The receiver also includes a noise estimation unit that may filter the magnitude values using a high pass filter and may generate a noise value representative of a noise portion of the received FM signal based upon the filtered magnitude values.

18 Claims, 3 Drawing Sheets

FREQUENCY MODULATION RADIO RECEIVER INCLUDING A NOISE ESTIMATION UNIT

BACKGROUND OF THE INVENTION

1. Field of the Invention

This invention relates to radio receivers and, more particularly, to noise estimation within frequency modulation (FM) receivers.

2. Description of the Related Art

Frequency modulation (FM) radio is widely used for radio programming. One reason FM became more popular for music broadcasts than, for example, amplitude modulation (AM), is in many cases FM reception is less affected by noise than AM. In an FM signal, the transmitted carrier signal frequency is varied by the frequency of the information (e.g., at an audio rate) within a given bandwidth. In an AM signal, the transmitted carrier signal amplitude is varied by the frequency of the information (e.g., at an audio rate), thereby creating an envelope that is defined by the information frequency. As such, a significant drawback to AM signals is the amount of noise that may be present in the received signal. In many FM receivers, the effects of received noise may be reduced using various well-known methods such as limiting or over-driving. In these methods, the received signal may be over-driven such that the amplifiers begin to clip. Since noise in an FM signal may be "riding" on the peaks of the received signal, much of the noise may be removed, while the information carried by the signal remains.

Modern FM receivers include many features such as soft mute, seek, and blend, for example, which may enhance a users listening experience. To effectively implement these types of features, an estimate of the signal-to-noise ratio (SNR) may be desired. However, depending on such parameters as the environment and the frequency, the signal strength and noise floor may vary, thus making accurate SNR estimations difficult.

SUMMARY

Various embodiments of a radio receiver are disclosed. In one embodiment, a radio receiver includes a processing unit that may generate a magnitude value corresponding to a signal strength of each of a plurality of digital samples of a received frequency modulation (FM) signal. The receiver also includes a noise estimation unit that may filter the magnitude values using a high pass filter and may generate a noise value representative of a noise portion of the received FM signal based upon the filtered magnitude values.

In one specific implementation, the high pass filter may include a first order differentiator that may provide a difference value corresponding to a difference between a first magnitude value and a next successive magnitude value.

Figure 1:
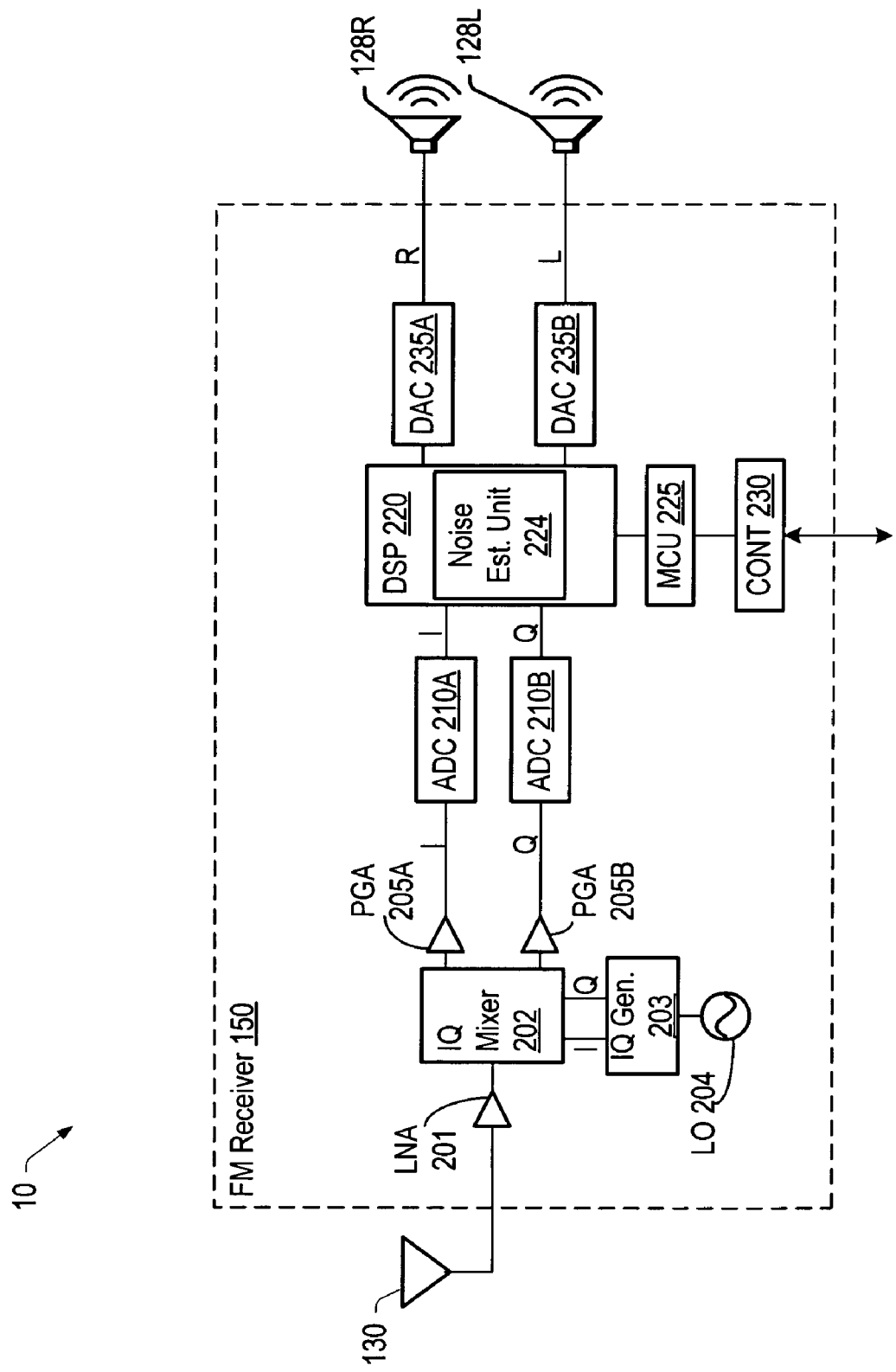
FIG. 1 is a block diagram of one embodiment of a radio system including a frequency modulation (FM) receiver.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram of one embodiment of a radio system is shown. Radio system 10 includes a frequency modulation (FM) receiver 150 that is coupled to a receiver antenna 130 and to a pair of speakers 128R and 128L. In various embodiments, FM receiver 150 may be configured to operate alone or as part of any of a variety of radio systems. For example, FM receiver 150 may be part of an FM radio, or part of a wireless communication device, such as a cellular telephone handset that includes FM reception functionality. Additionally, FM receiver 150 may be configured to operate as part of a multifunction radio system such as a car or home stereo system. As such, radio system 10 may be representative of any type of radio system that may include an FM receiver.

In the illustrated embodiment, FM receiver 150 includes a low noise amplifier (LNA) 201 that is coupled to receive an RF signal from antenna 130. LNA 201 is a part of the receiver that may be referred to as the RF front end. The output of LNA 201 is coupled to an in-phase/quadrature (IQ) mixer 202. IQ mixer 202 is coupled to a quadrature generator designated IQ Gen. 203, which may provide quadrature local oscillator (LO) signals to IQ mixer 202. A receiver LO is coupled to IQ generator 203. The in-phase (I) and quadrature (Q) outputs of IQ mixer 202 are coupled to programmable gain amplifiers (PGAs) 205A and 205B, respectively. PGAs 205A and 205B are coupled to analog-to-digital converters (ADC) 210A and 210B, respectively, which are in turn coupled to a processing subsystem.

As shown in FIG. 1, the FM receiver 150 includes a digital signal processor (DSP) 220. DSP 220 is coupled to a microcontroller unit designated MCU 225, which is in turn coupled to a control unit 230. In addition, DSP 220 is coupled to a digital-to-analog-converter (DAC) 235A and 235B. As shown, DAC 235A and 235B are coupled to stereo speakers such as speakers 128R and 128L, respectively. It is noted that FM receiver 150 may include other components that have been omitted for simplicity. It also noted that in some embodiments only one speaker may used as desired.

As described above, FM receiver 150 may receive frequency-modulated signals at an RF frequency from antenna 130 and may provide the modulated signals at a lower frequency to the processing circuits. In one embodiment, FM receiver 150 may be configured to receive RF signals in the range of 87.9 MHz to 107.9 MHz, although other frequencies are possible. In the illustrated embodiment, FM receiver 150 is configured to heterodyne or mix the received RF signal with the receiver LO signal, resulting in the received RF signal being down-converted to a lower frequency. In some embodiments, this lower frequency may be the baseband frequency. Alternatively, in other embodiments, the down-converted frequency may be an intermediate frequency (IF), which may sometime be referred to as a low-IF. In such embodiments, an additional mixing stage (not shown) may be used to further down convert the IF to the baseband frequency. It is noted that the components used to down-convert the RF to a lower frequency may be referred to as being in the IF section.

During normal operation of FM receiver 150, LNA 201 may receive and amplify the incoming RF signal. The amplified RF signal is applied to both the I and Q portions of IQ mixer 202. IQ generator 203 receives the LO signal and generates quadrature LO signals for use by IQ mixer 202. IQ mixer 202 may be configured to mix the incoming modulated RF signal with the quadrature LO signals to produce a modulated I and Q signal pair. The I and Q signal pair is conveyed to the remaining portions of FM receiver 150 in I and Q channels. It is noted that as used herein, any device that generates or propagates an I and Q signal pair may be referred to as an IQ signal source relative to a device that consumes or sinks an I and Q signal pair. Thus, for example, IQ mixer 202 may be referred to as an IQ signal source, as may PGAs 205A and 205B taken together, or ADC 210A and 210B taken together.

The modulated I and Q signal pair is amplified by PGAs 205A and 205B and input into ADC 210A and 210B, respectively. In one embodiment, ADC 210A and 210B may be implemented as delta-sigma converters configured to convert the I and Q signals into respective I and Q bit streams which are input into DSP 220 for processing. In one embodiment, DSP 220 may operate on the samples using such functions as cordic processing and FM demodulation to recover the information in the received signal. After some additional processing, the information may then be provided to DAC 235A and 235B as stereo left and right outputs. DAC 235A and 235B may generate the analog L and R output signals that correspond to the digital outputs of DSP 220.

In the illustrated embodiment, MCU 225 may be configured to execute program instructions associated with application software and control functionality for FM receiver 150. In addition, control unit 230 may provide an interface for selected control functions associated with FM reception. For example, control unit 230 may provide tuning, volume, and other radio and audio function information to MCU 225.

DSP 220 may be representative of any of a variety of digital signal processors. As such, DSP 220 may include a processing engine including one or more execution units (not shown) configured to execute instructions and one or more hardware accelerators configured to perform specific functions. DSP 220 may process the I and Q bit streams from ADC 210A and 210B in groups that may be referred to as frames. For example, a given frame may include a number of samples. In the illustrated embodiment, DSP 220 also includes a noise estimation unit 224 that may provide a noise estimation for subsequent SNR calculations.

It is noted that by recognizing that high frequency variations in the magnitude of the received FM signal may correspond to noise in received FM signal. As such, manipulating the magnitude values may yield a noise value that may be used to estimate the SNR of the received FM signal. Accordingly, as described in greater detail below in conjunction with the description of FIG. 2, in one embodiment, noise estimation unit 224 may be configured to provide a noise value corresponding to the noise in the received signal by high pass filtering the magnitude of the received signal samples. In addition, the magnitude of the received signal may be low-pass filtered to provide a signal corresponding to received signal strength. The received signal strength and noise values may be provided to MCU 225, which may in turn, calculate the SNR.

Figure 2:
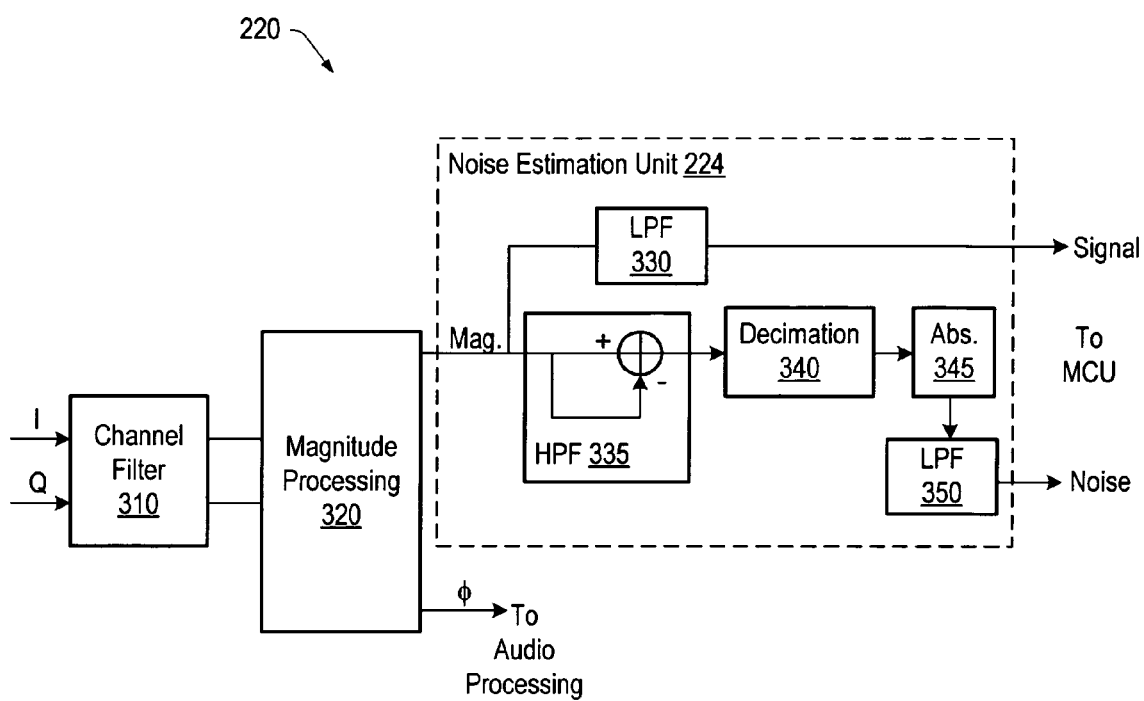
FIG. 2 is a block diagram illustrating more detailed aspects of the embodiment of the FM receiver of FIG. 1.

Referring to FIG. 2, a block diagram illustrating more detailed aspects of one embodiment the FM receiver of FIG. 1 is shown. DSP 220 includes a channel filter 310 that is coupled to a magnitude processing unit 320, which is coupled to noise estimation unit 224. As described above, the outputs of DSP 220 (e.g., noise and signal value) may be provided to MCU 225 of FIG. 1.

In one embodiment, channel filter 310 may be configured to receive the I and Q bit streams from ADC 210A and 210B and to provide I and Q samples of the received FM signal to magnitude processing unit 320. Channel filter 310 may be configured to attenuate signals that are outside of the channel (e.g., frequencies) of interest, thereby allowing signals within the channel to pass to magnitude processing unit 320.

In one embodiment, magnitude processing unit 320 may be implemented as a cordic processor configured to transpose coordinates of samples of the received FM signal from the rectangular coordinate system of the I and Q samples, to the polar coordinate system of magnitude and phase samples by rotating vectors using shift and add functions. In such and embodiment, the cordic processor may provide a magnitude value and phase angle value for each received sample. In an alternative embodiment, magnitude processing unit 320 may produce magnitude value samples by summing the square of the I and Q sample components. The magnitude value may correspond to the signal strength of each sample of the received FM signal. For an ideal FM signal, the magnitude should be relatively constant and the information is contained in the phase samples. Hence, variations in the magnitude may be due to non-ideal effects such as noise and/or multipath effects as mentioned above.

It is noted that in various embodiments, magnitude processing unit 320 may be implemented as a hardware accelerator of DSP 220. Alternatively, magnitude processing unit 320 may be implemented as program instructions executed by a processing engine of DSP 220. Similarly, it is contemplated that other functional blocks of DSP 220, and more generally various components of FM receiver 150, may be implemented in hardware or software, or a combination of both, as desired.

In one embodiment, ADC 210A and 210B may sample the received signal at a given sample frequency (e.g., 500 kHz). The samples may be grouped into a number of frames each having a number of samples (e.g., 16 sample frames). During each frame, noise estimation unit 224 receives the magnitude value of each sample and passes the magnitude value through a high pass filter 335. In one embodiment, high pass filter 335 may be implemented as a differentiator in which a difference value between each two successive magnitudes may be calculated and passed. Decimation unit 345 may decimate the number of difference values by using only a specified number of the difference values in a given frame. For example, in one embodiment, in a given frame, decimation unit 345 may use the difference value obtained from the next to last magnitude value and the last magnitude. This effectively decimates the number of magnitude values/samples by a factor of 16. It is contemplated that in various other embodiments, other types of high pass filters (e.g., finite impulse response (FIR)) may be used. It is also contemplated that if there is sufficient computational capacity, any number of values (difference or otherwise) may be used. For example, the difference value between each successive magnitude value may be stored and used.

The absolute value of the decimation output may be calculated by absolute value module 345 to provide a positive value that represents the noise power of the high pass filtered output. The resulting positive output value may be low pass filtered by LPF 350 to provide a noise value estimate. It is contemplated that in an alternative embodiment, to provide a positive value, the decimation output may be squared and the result low pass filtered.

In one embodiment, the noise value estimate may be provided to MCU 225 for further processing, during which an SNR calculation may be made. More particularly, as shown in FIG. 2, along with the noise estimation value, the signal value may be provided to MCU 225. Some typical power calculations may be performed by MCU 225 to obtain the SNR estimation. For example, the following equations may be used:

$$20 \log(noise) = \text{Noise Power (dB)} = N \text{ and}$$

$$20 \log(signal) = \text{Signal Power (dB)} = S, \text{ such that}$$

$$SNR = S - N$$

The noise estimate value and the SNR estimation obtained as described above may be used during subsequent signal processing. For example, the SNR estimate may be used to effectively implement such functionality as seek, blend, soft mute, and other functions that may rely on a good estimation of the noise in the received signal.

Figure 3:
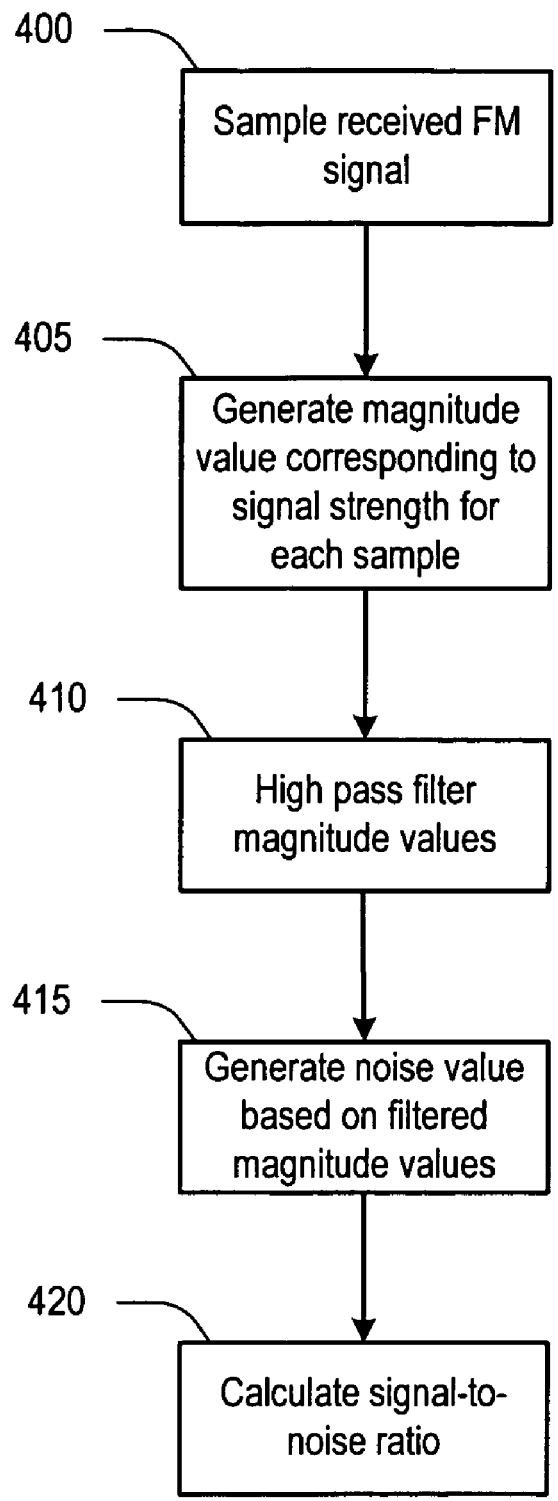
FIG. 3 is a flow diagram describing the operation of one embodiment of the FM receiver of FIG. 1 and FIG. 2.

FIG. 3 is a flow diagram describing the operation of one embodiment of FM receiver 150 of FIG. 1 and FIG. 2. Referring collectively to FIG. 1 through FIG. 3, a user may tune FM receiver 150 to a particular FM frequency via control interface 230. FM receiver 150 receives the FM signal via antenna 130. The received signal may be amplified, mixed into I and Q channels, and down-converted to a lower frequency as described above. The received signal may be sampled at a predetermined sample frequency by ADC 210A and 210B (block 400).

The samples of the received signal may be channel filtered to attenuate any energy outside the desired frequency range. As described above, magnitude processing unit 320 may generate a magnitude and phase angle for each sample (block 405). Each magnitude value may correspond to the signal strength of each sample. Since high frequency variations in the magnitude of the received FM signal may be attributed to noise in received FM signal, the magnitude values are high pass filtered (block 410). For example, in one embodiment, the high pass filter may embodied as a differentiator in which a difference between a sample's magnitude value and a next successive sample's magnitude value may be calculated. In one embodiment, the difference values may be decimated such that the difference between the next to last sample and the last sample in a given number of samples may be used. A noise value may be calculated by taking the absolute value of the difference value and low pass filtering the absolute value output (block 415). As described above, the noise value and the signal value may be provided to MCU 225, which may calculate an SNR estimation based on the noise value and the signal value.

It is noted that in some embodiments, the components of FM receiver 150 may be included as part of a single integrated circuit (IC). As such, the individual blocks or components shown in the figures are merely exemplary functional blocks drawn for discussion purposes. Indeed, it is contemplated that in other embodiments, functionality associated with a given block may be combined with other blocks as desired.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A radio receiver comprising:
   a processing unit configured to generate a magnitude value corresponding to a signal strength of each of a plurality of digital samples of a received frequency modulation (FM) signal; and
   a noise estimation unit configured to filter the magnitude values using a high pass filter and to generate a noise value representative of a noise portion of the received FM signal based upon the filtered magnitude values;
   wherein the high pass filter includes a first order differentiator configured to provide a difference value corresponding to a difference between a first magnitude value and a next successive magnitude value.

2. The radio receiver as recited in claim 1, wherein to generate the noise value the noise estimation unit is further configured to use the difference value corresponding to a difference between a next to last magnitude value and a last magnitude value within a frame that includes a given number of the plurality of digital samples.

3. The radio receiver as recited in claim 1, wherein to generate the noise value the noise estimation unit is further configured to use difference values corresponding to a difference between each magnitude value and a next successive magnitude value.

4. The radio receiver as recited in claim 1, wherein the noise estimation unit is further configured to use each magnitude value that is input to the high pass filter to generate the noise value.

5. The radio receiver as recited in claim 1, wherein the noise estimation unit is further configured to calculate an absolute value of the difference value to generate the noise value.

6. The radio receiver as recited in claim 5, wherein the noise estimation unit is further configured to filter the absolute value of the difference value using a low pass filter to generate the noise value.

7. The radio receiver as recited in claim 1, wherein the noise estimation unit is further configured to filter a square of the difference value using a low pass filter to generate the noise value.

8. The radio receiver as recited in claim 1, wherein the processing unit comprises a cordic processing unit configured to generate the magnitude value for each sample of the received FM signal.

9. The radio receiver as recited in claim 1, wherein the processing unit is configured to calculate a sum of a square of an in-phase component of the received FM signal and a square of a quadrature component of the received FM signal.

10. A method comprising:
    receiving a plurality of digital samples of a received frequency modulation (FM) signal;
    generating a magnitude value corresponding to a signal strength of each of a plurality of digital samples; and
    filtering the magnitude values using a high pass filter and generating a noise value representative of a noise portion of the received FM signal based upon the filtered magnitude values;
    wherein using the high pass filter includes generating a difference value corresponding to a difference between a first magnitude value and a next successive magnitude value.

11. The method as recited in claim 10, wherein generating the noise value further comprises using a difference value corresponding to a difference between a next to last magnitude value and a last magnitude value within a frame that includes a given number of the plurality of digital samples.

12. The method as recited in claim 10, wherein generating the noise value further comprises using difference values corresponding to a difference between each magnitude value and a next successive magnitude value.

13. The method as recited in claim 10, wherein generating the noise value further comprises using each of the magnitude values that is input to the high pass filter.

14. The method as recited in claim 10, wherein generating the noise value further comprises calculating an absolute value of the difference value.

15. The method as recited in claim 14, wherein generating the noise value further comprises filtering the absolute value of the difference value using a low pass filter.

16. The method as recited in claim 10, wherein generating the noise value further comprises filtering a square of the difference value using a low pass filter.

17. The method as recited in claim 10, further comprising providing a cordic processing unit for generating the magnitude value for each sample of the received FM signal.

18. The method as recited in claim 10, further comprising wherein the processing unit is configured to calculate a sum of a square of an in-phase component of the received FM signal and a square of a quadrature component of the received FM signal.

* * * * *